United States Patent
Adler et al.

(10) Patent No.: US 10,223,413 B2
(45) Date of Patent: *Mar. 5, 2019

(54) CAPTURING COMPONENTS OF AN APPLICATION USING A STATIC POST-INSTALLATION ANALYSIS OF THE SYSTEM

(71) Applicant: VMware, Inc., Palo Alto, CA (US)

(72) Inventors: Nir Adler, Netanya (IL); Dima Golbert, Beit Shemesh (IL); Or Lupovitz, Rishon Le Zion (IL); Kosta Shougaev, Rehovot (IL)

(73) Assignee: VMware, Inc., Palo Alto, CA (US)

( * ) Notice: Subject to any disclaimer, the term of this patent is extended or adjusted under 35 U.S.C. 154(b) by 45 days.

This patent is subject to a terminal disclaimer.

(21) Appl. No.: 15/364,219

(22) Filed: Nov. 29, 2016

(65) Prior Publication Data

US 2017/0249357 A1 Aug. 31, 2017

Related U.S. Application Data

(60) Provisional application No. 62/301,557, filed on Feb. 29, 2016.

(51) Int. Cl.
*G06F 9/44* (2018.01)
*G06F 17/30* (2006.01)
*G06F 8/61* (2018.01)
*G06F 8/70* (2018.01)

(52) U.S. Cl.
CPC .......... *G06F 17/30424* (2013.01); *G06F 8/61* (2013.01); *G06F 8/70* (2013.01); *G06F 17/30091* (2013.01); *G06F 17/30289* (2013.01)

(58) Field of Classification Search
CPC ...................................................... G06F 8/70
USPC ...................................................... 717/168
See application file for complete search history.

(56) References Cited

U.S. PATENT DOCUMENTS

| | | | |
|---|---|---|---|
| 8,930,886 B2 * | 1/2015 | Dunker | G06F 8/75 717/104 |
| 2012/0304168 A1 * | 11/2012 | Raj Seeniraj | G06F 8/38 718/1 |
| 2014/0137125 A1 * | 5/2014 | Hsu | G06F 9/4856 718/102 |

OTHER PUBLICATIONS

Kevin Knox, et al. "Magic Quadrant for Client Management Tools" Gartner, May 22, 2014 ID: G00260863, downloaded from http://www.creekpointe.com/pdfs/LANDesk%20Magic%20Quadrant%20for%20Client%20Management%20Tools.pdf.

* cited by examiner

*Primary Examiner* — Wei Y Zhen
*Assistant Examiner* — Lanny Ung

(57) ABSTRACT

A management agent operates transparently in the background on each endpoint computing device that needs to be managed. The agent performs a static analysis of the system on the endpoint computing device on which it is operating in order to capture the applications that have been installed on the endpoint device. The static analysis is performed after the applications have been installed on the endpoint device and therefore does not require installing the application on any dedicated staging machine, nor any recording of the pre-installation state. The post-installation static analysis involves steps that are used to determine all of the necessary components that comprise the application, which can then be packaged together and managed as individual application packages.

20 Claims, 4 Drawing Sheets

CAPTURING COMPONENTS OF AN APPLICATION USING A STATIC POST-INSTALLATION ANALYSIS OF THE SYSTEM

CLAIM OF PRIORITY

This application claims priority to and benefit of U.S. Provisional Application No. 62/301,557 filed Feb. 29, 2016, entitled "CAPTURING COMPONENTS OF AN APPLICATION USING A STATIC POST-INSTALLATION ANALYSIS OF THE SYSTEM", by Nir Adler et al., the disclosure of which is incorporated by reference herein in its entirety.

TECHNICAL FIELD

The present disclosure generally relates to application packaging and application management and more particularly relates to using a post-installation static analysis of the system to capture the necessary components that comprise an application.

BACKGROUND

Information Technology (IT) management has become an increasingly complex task for a large organization. There may be thousands of users (e.g. employees) carrying their own individual endpoint devices (e.g. laptops, workstations, smart phones, tablet computers, etc.) and each device may have an abundance of software and applications that are operating on the device. Some of these applications are unique to each individual user, while others are identical across several devices or at least share some of the same components (e.g. files, registry entries, data). Users generally want the freedom to install whatever software and applications they choose while IT departments are faced with the need to maintain compliance and data protection across this complex ecosystem. For example, a typical IT department today needs to be able to manage, secure and deliver applications to users, distribute software updates, as well as be able to back up and restore any user's data and settings on demand.

One requirement for managing applications on such a large scale is being able to produce an application package that can be distributed from a central location to a large number of endpoint devices, where the package can be deployed and executed. There exist a number of software solutions, sometimes referred to as "application capture" systems that attempt to aid organizations in creating such packages. For example, the System Center Configuration Manager (SCCM) available from Microsoft Corporation; the LANDESK Management Suite (LDMS) available from LANDESK Software; and the Client Management Suite (CMS) available from Symantec Corporation; all take different approaches in assisting an IT administrator in application management, including in some cases capturing an application package that could be delivered to end user devices.

Conventional solutions for the capture, delivery and management of applications often leverage recording technologies during the application installation. This generally means that each application must first be installed separately on a dedicated clean staging machine, which could be a virtual machine or a physical computer. For example, one type of process for capturing an application first records the state of the system on the staging machine prior to installing an application (i.e. captures a pre-installation snapshot) and then records the state of the system again after the application has been installed (i.e. captures a post-installation snapshot). Based on comparing the pre-installation snapshot and post-installation snapshot, the system is able to compute a delta that indicates which files and registry entries were added, removed, and modified during the installation process. This delta can presumably then be used to determine which components (files, registry entries, etc.) actually comprise the application so that a package containing those components can be created and delivered to multiple endpoint devices.

However, the type of process mentioned above suffers from a number of shortcomings, including the possibility of missing some necessary components of an application. In some situations, the application installation process may require certain files which were already present on the device before the installation and, as such, the installation process might not actually affect those files. In such cases, the pre-installation/post-installation comparison would not indicate that these files were modified by the installation process and, consequently, those files would not be included in the application package. One simple example of such a situation occurs when the capture process attempts to install Microsoft Visio application on a staging machine that already has Microsoft Office preinstalled thereon. Since Microsoft Office contains many of the files that are necessary for Visio, merely looking at the post-installation changes on that machine would not yield all of the required components of Visio. Therefore, when such a package is delivered to another machine (which does not have Microsoft Office preinstalled thereon) the application would not function properly. Additionally, conventional application captures may also be vulnerable to capturing "noise" along with the target files. For example, between the time of pre-installation snapshot and post-installation snapshot, another application may have updated itself, an operating system update may have applied, or another change taken place. The change may have added or modified certain files which are actually unrelated to the application installation, but these changes would be included in the captured package. Including such noise in the application package may cause problems when delivering the package to other machines. Yet another limitation of conventional application capture process described above is that it requires a recording of the pre-installation state, which is not always available in the first place.

It should be noted that the process described above is just one example of an application capture and not all of its shortcomings may be applicable to all such systems. However, most conventional application capture systems still suffer from at least one form of inefficiency or another. Generally speaking, the inherent difficulty in trying to create an application package using conventional capture systems stems from the large numbers of users, devices and types of software that are involved. Organizations may reach inventories with thousands or even tens of thousands of applications, each of which requires a significant investment in time and resources to capture. Many organizations are intimidated by the amount of work and resources they will need to invest in order to start managing the applications. At the same time, those which are willing to perform all the required manual work to capture applications soon find out that this is an on-going never-ending process, since for every new version of an application the administrator needs to re-capture the application and repeat the process. Additionally, many conventional application capture systems suffer from incomplete captures and noise during the capture process mentioned above. All of these vulnerabilities cause malfunctions as well as incorrect and unexpected behavior when trying to use the captured application on the endpoint devices. This represents an additional pain point for the organization—testing that the application capture was indeed successful and will work as expected on the end user's actual environment. In light of all of these shortcomings, more efficient system for capturing and managing applications is needed.

DETAILED DESCRIPTION

Figure 1:
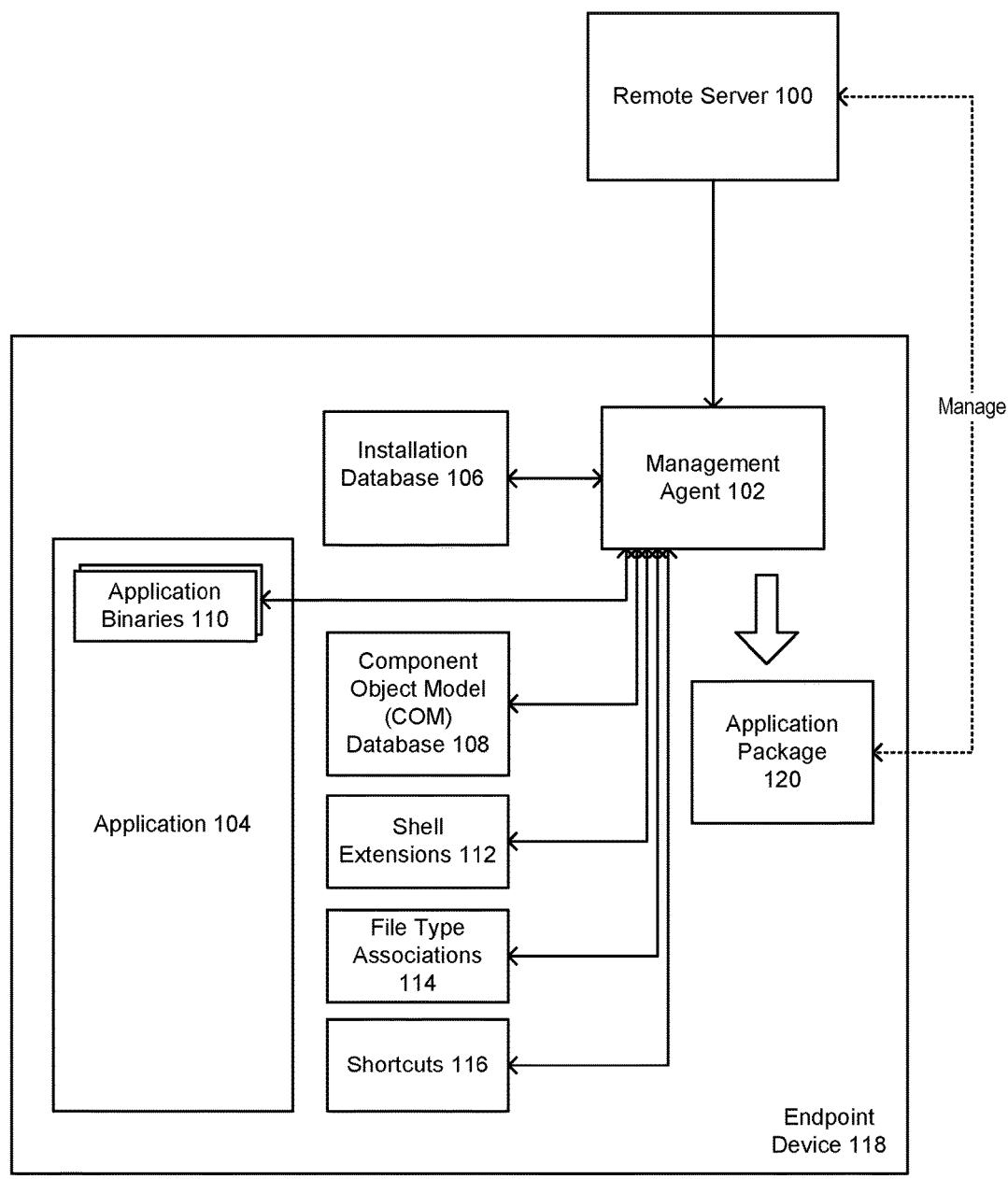
FIG. 1 illustrates an example of a system for capturing application components using a static analysis, in accordance with various embodiments.

Systems and methods in accordance with various embodiments of the present disclosure overcome at least some of the above mentioned shortcomings and deficiencies by providing an improved mechanism for capturing applications and creating application packages that can be executed and managed on endpoint devices. While conventional application capture systems generally take a top-down approach where applications are packaged, inventoried and then delivered to end user devices from a central location, the embodiments described herein enable a bottom-up approach, where instead of capturing applications in a sterile staging environment, applications are captured in their natural environment: on the desktops in use by end-users. This approach allows an administrator of an IT department to regain control over the flurry of user installed applications that end users are using across all of their numerous devices in the organization and allow for a painless and gradual transition to a fully managed application ecosystem.

In various embodiments, an application management agent operates transparently in the background on each endpoint computing device that needs to be managed. The agent performs a static analysis of the system on the endpoint computing device on which it is operating in order to capture the applications that have been installed on the endpoint device. The static analysis is performed after the applications have been installed on the endpoint device and therefore does not require installing the application on any dedicated staging machine, nor any recording of the pre-installation state. The post-installation static analysis involves several steps that are used to determine all of the necessary components that comprise the application, which can then be packaged together and managed as individual application packages.

In various embodiments, the agent begins by inspecting the installation database (e.g., add/remove registry database) on an endpoint computing device to determine a set of basic components of the application installed on the endpoint computing device. The set of basic components includes a number of resources, including one or more binary files which are capable of being executed. The agent then parses all binary files that were found to identify any character strings inside each binary file that indicate a file system path, a registry path, a file name or an imported module. These components identified by the character strings (folders on the file system path, registry, file, module etc.) are also captured by the agent and added to the application package. The agent can further scan a component object model (COM) database on the endpoint device to identify any references to files that were previously captured (i.e. during inspection of the installation database or identified by the character strings in the binary files). For any records of the COM database that contain such references to previously captured files, the entire COM record is collected. In addition, the agent may scan the shell extension references in the registry, looking to identify any shell extensions that are based on the files that were previously captured. If any such shell extensions are found, they are collected as well. Furthermore, the agent collects all of the file type associations on the endpoint device so that the application package includes which file type extensions are associated with the application. Finally, the agent scans all shortcuts on the desktop and the start menu on the endpoint device in order to identify any shortcuts that reference the previously captured files. These shortcuts will also be collected since they form part of the application package.

Based on the static analysis of all the above components, the agent is able to produce a complete application package that is comprised of the basic components and any additional resources which might be required in order to execute the application. Once the application package has been produced, it can be remotely managed by the administrator from a remote location. In one embodiment, the application package can be packaged as a virtual hard disk (VHD) file, which can be distributed to other endpoint devices, where it can be executed and managed.

FIG. 1 illustrates an example of a system for capturing application components using a static analysis, in accordance with various embodiments. As illustrated, a management agent 102 can be downloaded and installed on each endpoint device 118 that is to be managed. In one embodiment, the agent 102 can be downloaded from a remote server 100, such as a server where the administrator of the IT department has a console. Once the agent has been downloaded, it can display a list of all applications installed on the endpoint device and enable the user (or administrator) to select which applications should be captured and encapsulated in an application package. In one embodiment, the management agent 102 transparently runs in the background of an existing end-user's desktop and uses several techniques to capture the applications that are currently installed by the end-user. To capture an application, the management agent performs a static analysis of the Windows operating system (OS), including registry and file system, in order to detect the presence of the presence of the application 104. The static analysis spans several steps, as discussed below.

In various embodiments, after being installed on the endpoint device, the management agent 102 first scans the installation database 106 on the system. The installation database 106 is located in the registry of the endpoint machine 118. For example, in the Windows operating system, the installation database is what allows the conventional Add/Remove programs widow to be displayed that a user can see, which lists all programs installed on the endpoint device, which the user can select to un-install. Based on scanning the installation database 106, the agent is able to determine which applications are installed on the endpoint computing device. The agent 102 then presents the user with a choice of which applications the user would like to capture.

After the user selects the application(s) that he/she would like to capture, such as application 104, the management agent 102 first scans the registry. The management agent 102 is able to determine where the main application is installed—for example, the application may point from the registry to an entire folder. Alternatively, it might point to a single file or several files. The process of capturing the application begins there.

In various embodiments, the agent 102 uses several heuristics to capture either files or entire folders for applications. For example, the agent may start with scanning the uninstall database to see all of the un-installable applications, then once the information about these applications is collected, the agent 102 can go to other places in the Operating System (OS) which have more information about each installed application. The uninstall database thus provides a starting point of where to look for the initial application components. The uninstall database typically contains registry key for each application and the registry key contains information about the application name, the application publisher, the command that would be invoked to uninstall the application, and the like. Some information may not be located in the uninstall database. For example, in the Windows OS, the icon of the application would not be located in the uninstall database. Thus, to determine the icon of the application, the agent 102 may look at other registry keys. All of these areas are referred to as the installation database 106 as shown in FIG. 1. In various embodiments, the agent utilizes some pre-coded heuristics to capture either files or entire folders based on the initial components determined from the installation database 106. These files and folders are added to the application package. In one embodiment, the capture is performed by creating a folder which will serve as a mount point for the VHD file. The agent 102 then starts bringing all the files/folders into that folder (e.g. by copying the files into that folder).

Once the agent 102 has captured the initial application components based on scanning the installation database 106, it scans the actual captured portable executable (PE) files 110 of the application (e.g. executables and DLLs) to search for strings that resemble paths (registry or file paths). The agent then collects the files or folders pointed to by those strings as well. For example, if an application needs to open a particular file (e.g. a log file or system 32 file) the path of that file will usually be hardcoded in the code of the binary executable file 110. The agent 102 is able to scan the code of the binary executable file 110, identify the file path in the binary and then add the file indicated by that file path to the captured application package (i.e., copy it to the mount point for the VHD file). The code can be scanned by using the PE header of the binary executable file 110. For example, under the Windows OS, every DLL file is of the format is Portable Executable (PE), which is a standard format that is well documented. The agent 102 can use such documentation to skip directly to the correct portion of the file where all of the strings are located.

Both of the methods above work together to aid in the capture of the entirety of the application. In some situations, a single method alone would not yield all of the necessary components of the application and the other method can be used to supplement it. For example, the application may be installed in one folder, however the application may actually write to log files which are located in a different folder. While only inspecting the installation database would yield the main application components, there would not be any available information of where the application stores such log files. However, if the agent then scans the main components (binary executables), those components will contain the information for the file path to where those log files are written somewhere within the binary executable file. By scanning the binaries and collecting those files, the agent is able to bring those log files along with the rest of the application components.

Once the initial application components have been collected and the binary executable files parsed and files/folders pointed to by strings have been captured, the agent 102 can scan the component object model (COM) database 108. The agent scans the COM database 108 to determine whether the application utilizes any COM calls or COM interfaces. If the application does use such calls/interfaces, the agent 102 collects both the interface and the files associated with it.

COM is a binary interface standard provided by Microsoft Corporation, which allows inter-process communication—one process can call a function that is written in another file using this method. It allows transferring objects between several processes and components. So for everything that the agent 102 has collected up to this point (i.e., the components collected based on inspecting the installation database 106 and the components collected based on parsing the binary executable files 110), the agent checks to see if there are any references to any COM interface. If there are such references, the agent 102 collects them as well. This means collecting both registry and files. For example, if the COM database 108 points to a certain interface and a DLL file, the agent 102 will collect both the component in the registry and the DLL file itself from the file system. These will be included in the package as well by copying them to the folder serving as the mount point for the VHD file.

The agent 102 then collects shell extensions 112. Shell extensions 112 are used to by applications to extend the menu associated with the application. For example, when right clicking an application, a menu is frequently displayed with customized menu items that are specific to that application. The shell extensions 112 are used to extend the menu in this manner and to populate the menu with such additional menu items. By collecting the shell extensions, the agent 102 ensures that the application package will bring with it its own extended menu items which might be displayed by right clicking on its icon.

Next, the agent 102 scans the desktop, start menu and other user areas for shortcuts 116. If any such shortcuts point to the files the agent has already collected (based on scanning the installation database and binary executables), the agent collects those shortcuts as well.

In some embodiments, the agent 102 also collects file type associations 114 of the application. For example, if the user has Microsoft Office installed on the endpoint computer 118, it will be used to open files with the ".doc" and ".docx" extensions. This file type association information can be collected by the agent as well. This way, when the application package is delivered to another endpoint device, the device will know to open those types of files with the new application.

Figure 2:
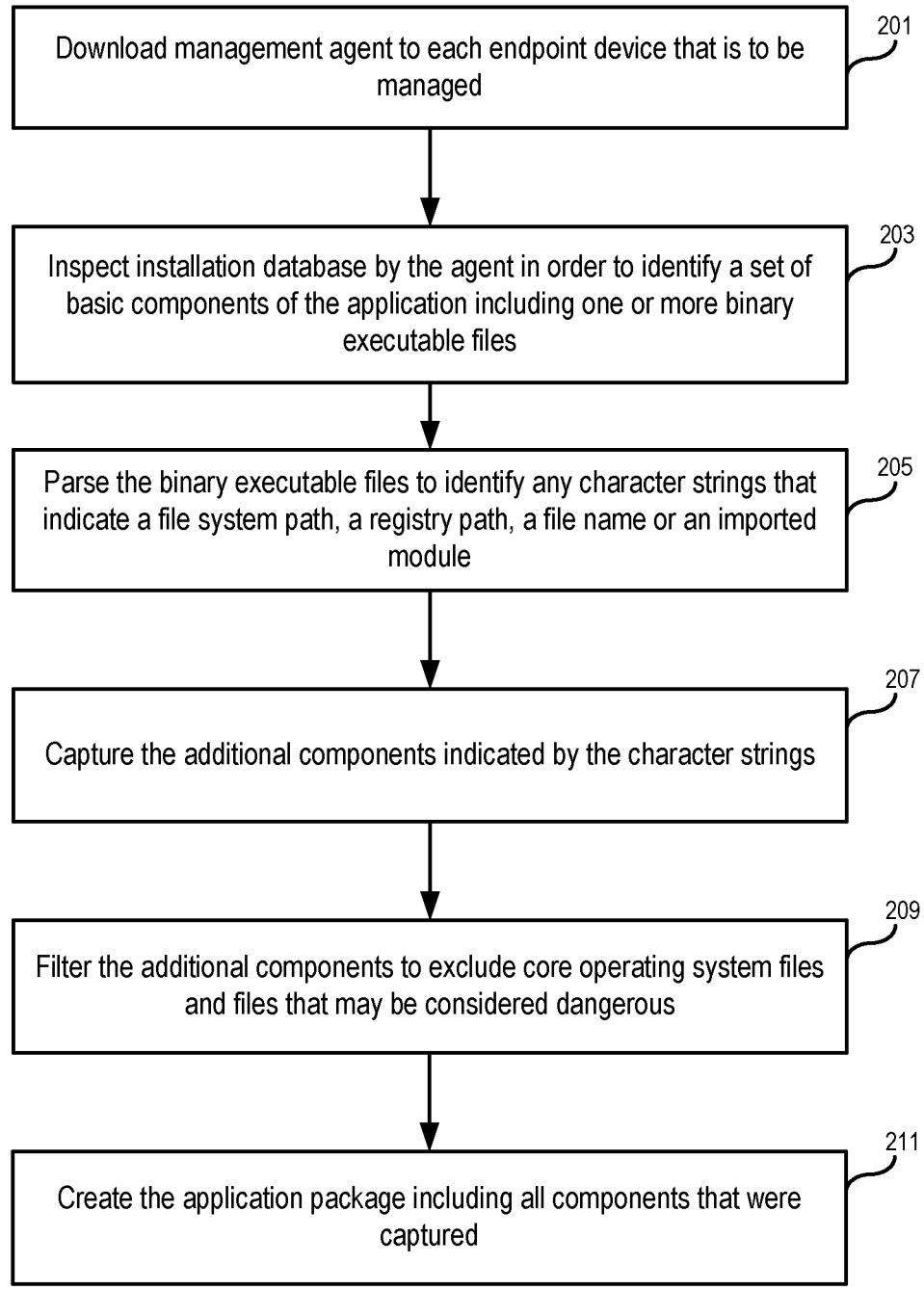
FIG. 2 illustrates an example of a process for capturing application components using a static analysis, in accordance with various embodiments.

FIG. 2 illustrates an example of a process for capturing application components using a static analysis, in accordance with various embodiments. As illustrated in operation 201, the process begins by downloading and installing a management agent to each endpoint device that is to be managed. Once the agent is operating on the endpoint device, the agent first inspects installation database (e.g.

add/remove registry) in order to identify a set of basic components of the application including one or more binary executable files, as shown in operation 203.

In operation 205, the agent analyzes any binary executable files found by inspecting the installation database and parses those binary executable files to identify any character strings that indicate a file system path, a registry path, a file name or an imported module. The components (e.g. files/folders) that are indicated in the binary executables are filtered to exclude core OS files and potentially dangerous files (operation 209) and the remaining components are captured. Based on the captured components, an application package can be created, as shown in operation 211, and this application package can be delivered to other endpoint devices where it can be executed. The static analysis runs in the background without the user having to perform any actions. The information collected allows the agent to encapsulate an application into a VHD file to be delivered from any one endpoint to other endpoints.

Figure 3:
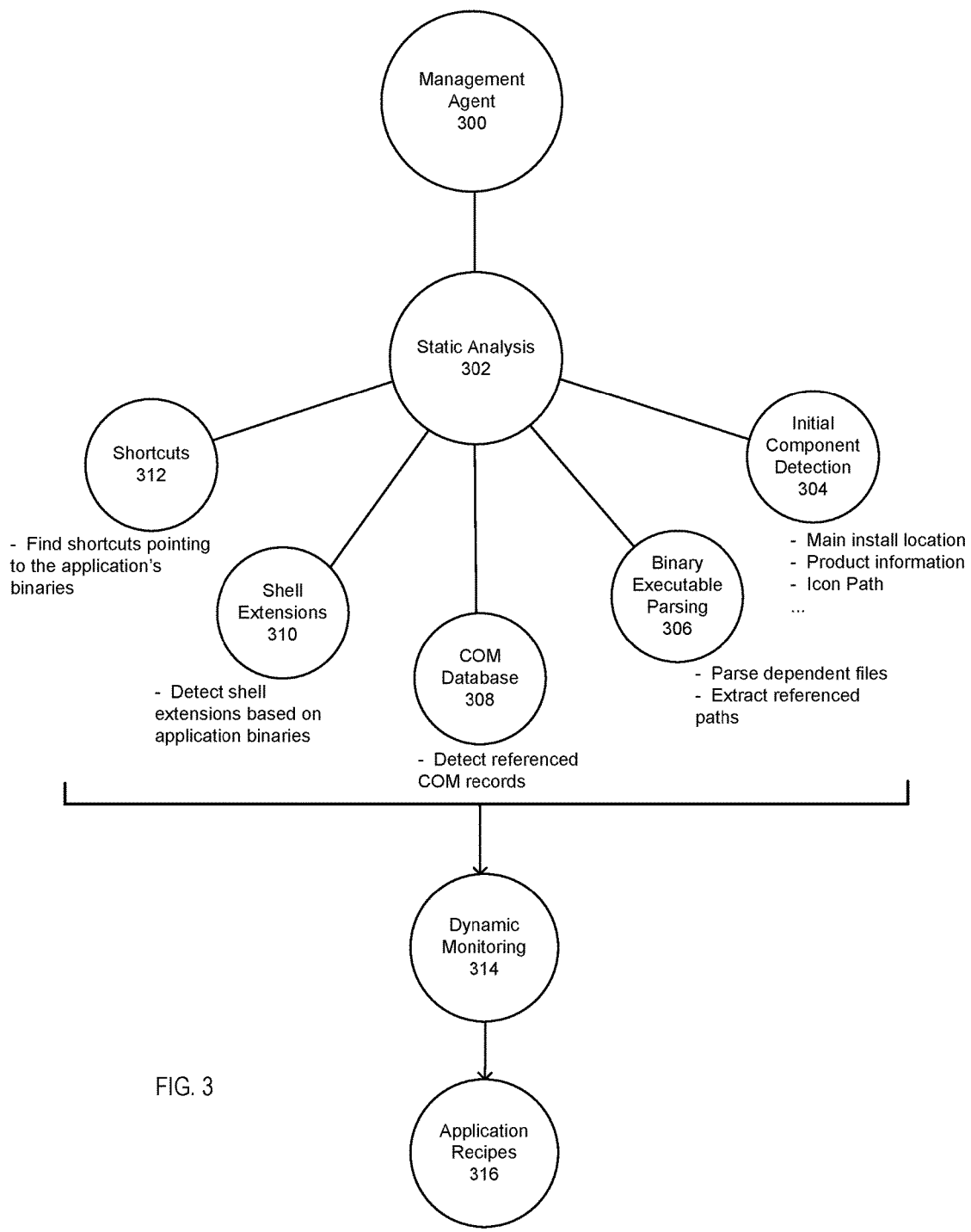
FIG. 3 illustrates an example of capturing applications using a static analysis, monitoring the application and creating application recipes, in accordance with various embodiments.

FIG. 3 illustrates an example of capturing applications using a static analysis, monitoring the application and creating application recipes, in accordance with various embodiments. As shown in the illustration, the management agent 300 operates in the background of an existing user's desktop and uses several techniques to capture the applications that have been installed by the end user. The techniques include (1) static analysis 302 of the presence of the application in the operating system, including registry and file system; (2) dynamic monitoring 314 of the application's activity in the operating system including accesses to files and registry and indirect spawning of processes and (3) Database of application recipes 316 to support corner cases and allow tenants to contribute to and benefit from each other. As previously described, the static analysis 302 performed by the management agent 300 includes a number of different functions that all serve to capture a complete application package, which can be deployed to other endpoint devices. Each of the functions are discussed in further detail below.

Initial Component Detection 304—The first step is parsing all the relevant information from the Add/Remove registry database(s). This information may include any of the following:
 a. Main install location
 b. Uninstall command
 c. Icon path
 d. Product ID (for MSI installer)
 e. Upgrade Code (for MSI Installer)
 f. Display Name
 g. Publisher, etc.

This information can be used to detect the basic components of the application. For example, the install location, uninstall command and icon may indicate the application files. For Microsoft Installer (MSI) installers, the MSI database in the registry will contain the different files system and registry components of the application. This information is used to collect the initial components.

The MSI database can be very useful for collecting the application components. The registration of where some of the application files and registry are located are used to collect the application components. Moreover, the MSI database can imply that a specific component is shared across multiple applications.

Some heuristics are added in this phase. For example, the MSI database may reference only a single file in a folder, while in actuality the entire folder is required. However, for every folder of the application, there should be at least one record in the MSI database. Therefore, when the MSI database points to a specific file in directory, we collect the entire folder (non-recursively). Several other heuristics can also be implemented to improve and stabilize the application capture. One heuristic may be that in order to ensure the protection of certain sensitive system areas, only single file collection is allowed in such predetermined areas. For example, if the application is pointing to the path "C:\Windows\System32\MyFile.dll", only this file will be collected, and not the entire folder. In other paths, the entire folder may be collected.

Binary Executable File Parsing 306—Once the basic application components have been collected, the management agent parses all of the binary executable files (e.g. EXE, DLL), searching for: (a) strings that indicate file system paths; (b) strings that indicate registry paths (c) strings that indicate filenames; and (d) imported modules. For strings that indicate such paths, the components referenced by those strings are also collected for inclusion in the application package. In some embodiments, if the strings found in the binary executable contain a file path to another executable, then that other executable can also be parsed, searching for strings that resemble file system paths, registry paths, file names and imported modules.

File system and registry paths can then be normalized and filtered. The result is that only the existing, non-dangerous paths are collected. For example, paths to sub-folders of the main application folder can be considered and collected. Suspected filenames are searched in several locations, such as "C:\Windows\System32". Core operating system files are filtered, and only non-core-OS files will be captured. For example, in the case of the Windows operating system, this may mean that "Kernel32.dll" and "ntdll.dll" will not be captured, but "vccorlib120.dll" and "atl100.dll" will be captured.

Once all of the initial components have been detected and the binary executable files are parsed and the additional components indicated by the strings in the binaries have been gathered, most of the application components necessary for execution of the application have been captured. However, a number of useful components still remain.

COM Database Scanning 308—In one embodiment, the management agent scans the component object model (COM) database in the registry, searching for related COM records that are required by the application. If any such records are found, they are captured as well. This is performed by checking every COM record in the registry for reference to files which were previously captured (during Initial Component Detection 304 and Binary Executable Parsing 306). If any such reference is found, the entire COM record is captured, along with the relevant COM interface.

Shell Extension Scanning 310—In one embodiment, the management agent scans the shell extension references in the registry, looking for shell extensions which are based on already-captured files (i.e. files captured during the initial component detection 304 and binary executable parsing 306). If such shell extensions are found, they can also be collected.

Shortcut Capture 312—In some embodiments, the agent enumerates and parses all of the desktop and start menu shortcuts. The target of each shortcut is checked against the already captured files (i.e. files captured during the initial component detection 304 and binary executable parsing 306). If the agent detects a shortcut which points to an already-captured file, the shortcut is collected.

Once the static analysis has been completed, the application package should contain all of the components that comprise the application. At this point, the application package can be distributed to other endpoint devices and otherwise managed by the administrator. Additionally, in some embodiments, the management agent can be configured to perform dynamic monitoring 314 of the application after the static analysis has been completed.

Dynamic Monitoring 314—This method is designed to get as close as possible to the application's component closure. During this phase, the application is executed while monitoring all the files system and registry accesses of the application, including the sub-processes of the application. In one embodiment, the file system and registry access monitoring (as well as sub-processes and services monitoring) is implemented by the management agent listening and parsing kernel-events generated from Event Tracing for Windows (ETW), a framework built into the Windows operating system. Using ETW allows minimal intervention in the machine, since no dedicated installed driver is required. In an alternative embodiment, a kernel mode mini filter driver may also be used to monitor all relevant file system and registry access.

In various embodiments, dynamic monitoring 314 enables the agent to complete the detection of any components of the application which may have possibly been missed by the static analysis. Dynamic Monitoring can run in several different modes:
  a. Hidden Mode—the application is executed in the background, hidden and with no user interaction. In this case, every collected desktop/start menu shortcut is started and monitored. The hidden mode is achieved by running the application under a different, dedicated, desktop environment. The application is running under newly created "clean" user. This allows mimicking the application behavior when the application is running for the first time.
  b. Active Mode—the user can execute the application and use it, while dynamic monitoring only collects the file system and registry access by the application.

Based on the dynamic monitoring, the agent may be able to determine which components if any, the static analysis has missed. For example, if the agent detects that the application is making a call to a component that is not included in the application package and that component is not a core operating system file that would normally be available on every endpoint, the agent may retrieve that component and add it to the application package on the assumption that the component is part of the application.

In some embodiments, after the application capture process is complete, a recipe can be created for the captured application. Application recipes 316 are capture instructions, containing the desired files and registry to capture. They can be helpful in several ways:
  a. They may save the time required for the static-analysis and dynamic monitoring. Once a recipe is created, one may capture an application based solely on the recipe.
  b. They eliminate the need for further testing of the captured application. Since the recipe represents a working and tested capture of an application, the IT admin needs not test it again.
  c. They enable IT to handle complex/obfuscated programs—some programs can be difficult to capture. For these application captures, defining the required component to capture will allow capturing and using the application.
  d. Once recipe is created, it can be uploaded and shared over the network (e.g. cloud-based recipes). This allows collaboration between different organizations, as well as providing specific application customizations.

As previously discussed, some applications may be difficult to capture and require special rules and/or modifications. For example, some applications may communicate or rely on external third party services in order to carry out their intended functionality. In such cases, to provide a full capture of the application, the third party service should be captured as well and included as part of the application package. However, this is not always easy or even possible. In order to better aid organizations in addressing these more difficult situations, the use of application recipes can be used to create communities between such organizations. By sharing the application recipes between different organizations, it is possible to reconstruct a captured application on an entirely different system. Because the application recipe contains only the file signatures and not the actual content of the files, no sensitive information is shared between the organizations by sharing the recipes. Moreover, the use of signatures in place of the actual content may, in some cases, enable organizations to share these signatures without the risk of violating licensing restrictions or risk of information leakage, though the actual risks would need to be evaluated on a case by case basis. In any event, a contribution model of sharing application recipes proposed herein would enable customers to contribute recipes (in an automated fashion) for the benefit of the community as well as enjoy the contribution of others.

In various embodiments, after the application capture is complete, testing may need to be performed. In some cases, the captured content may be missing, incorrect or problematic (e.g., if operating system components are captured) and testing may need to be performed before the application is deployed in any production environment. There are several testing approaches available for the application capture systems described herein.

In one approach, a virtual machine is used to test the captured application. Generally, the end-user knows best how to test the application because the user is the one that is actually using the application live. Instead of assigning the application to a different user, or providing the user with a different machine, testing can be performed by utilizing a hypervisor running on the endpoint device. This can be done by using the following steps:
  a) On the user's endpoint machine, use a hypervisor to run a clean operating system (OS) virtual machine (VM);
  b) Assign the captured application is assigned to the virtual machine;
  c) Replace all the application's shortcuts on the end-user machine to point into the application from inside the virtual machine;
  d) When the user runs the application, the application will actually be running from inside the VM;
  e) If any problems are encountered, the user can notify the administrator that the captured application is not working correctly.

Such VM based testing can be used to increase the completeness of the application capture. For example, when the application is trying to access a missing component, which exists on the physical endpoint machine, the missing component will be automatically collected from the physical machine into the VM, and added to the captured application.

In an alternative testing approach, application virtualization technology can be used to replace the end-user application with a virtualized application. One example of application virtualization technology is ThinApp, available from VMware, Inc. If the application tries to access components which are missing from the captured application, they will be added to the ThinApp package as well as to the captured application. This allows for functional testing along with adding missing components without interfering the end user's work.

In various embodiments, the management agent is able to remove the local copy of the application, therefore unassigning the application, which will result with the application being completely removed from the machine. This is done by removing the application-specific components from the machine. For MSI applications, only non-shared component are removed, while shared component remain on the machine (to prevent breaking of other programs). If the application is removed in this manner, this means that the agent is effectively replacing the entire application with a managed version of the application. This results in the potential for moving from any environment to an entirely managed one, giving the IT admin the power to control any and all of the software on the organizations' endpoints, while causing minimal/no interruption to end-users' productivity.

Figure 4:
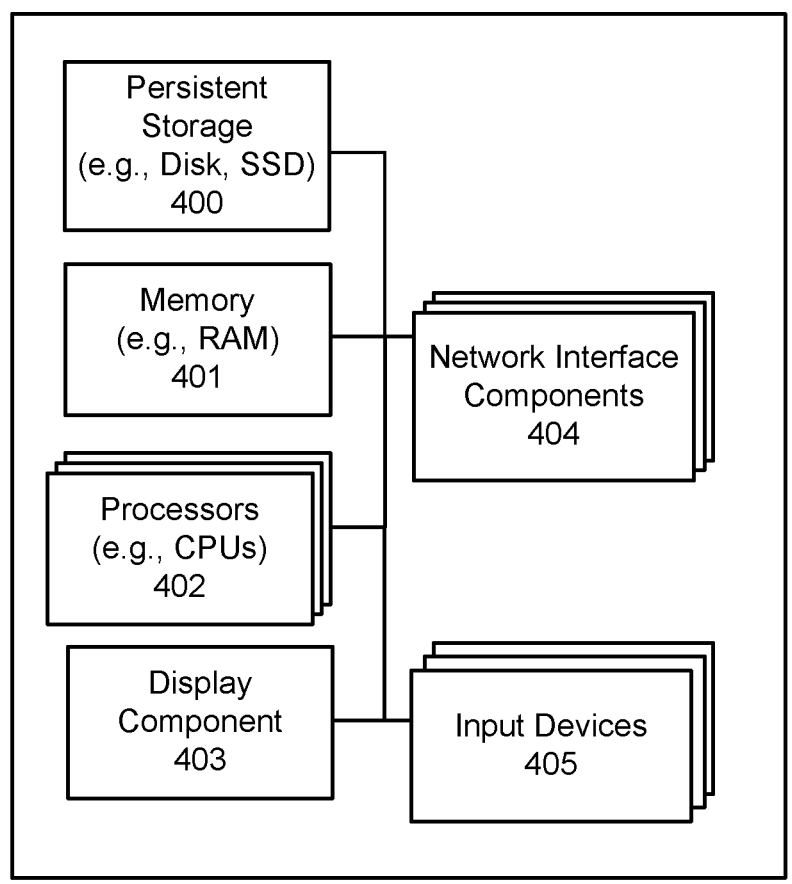
FIG. 4 illustrates an example of some general components of a computing device, in accordance with various embodiments.

FIG. 4 illustrates an example of some general components of a computing device, in accordance with various embodiments. In this particular example, the device includes one or more processors (e.g., central processing units (CPUs) 402 for executing instructions that can be stored in a storage medium component. The storage medium can include many types of memory, persistent data storage, or non-transitory computer-readable storage media. For example, the storage medium may take the form of random access memory (RAM) 401 storing program instructions for execution by the processor(s) 402, a persistent storage (e.g., disk or SSD) 400, a removable memory for sharing information with other devices and/or the like. The computing device typically can further comprise a display component 403, such as a monitor, a touch screen, liquid crystal display (LCD), or the like. In various embodiments, the computing device will include at least one input device 405 able to receive conventional input from a user. This conventional input can include, for example, a push button, touch pad, touch screen, wheel, joystick, keyboard, mouse, keypad, or any other such device or element whereby a user can input a command to the device. In some embodiments, the computing device can include a network interface component (NIC) 404 for communicating over various networks, such as a Wi-Fi, Bluetooth, RF, wired, or wireless communication systems. The device in many embodiments can communicate over a network, such as the Internet, and may be able to communicate with other devices connected to the same or other network.

Various embodiments described herein can be implemented in a wide variety of environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Many embodiments utilize at least one network that would be familiar to those skilled in the art for supporting communications using any of a variety of commercially-available protocols, such as TCP/IP, FTP, UDP or the like. The network can be, for example, a local area network, a wide-area network, a virtual private network, the Internet, an intranet, an extranet, a public switched telephone network, an infrared network, a wireless network, and any combination thereof.

The various environments in which the embodiments can be implemented may include a variety of data stores and other memory and storage media, as discussed above. These can reside in a variety of locations, such as on a storage medium local to one or more of the computers or remote from any or all of the computers across the network. In some embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for application capture using a post-installation static analysis, the method comprising:
   inspecting an installation database on an endpoint computing device to determine a set of basic components of an application installed on the endpoint computing device, the set of basic components including one or more binary executable files;
   parsing the one or more binary executable files to identify character strings that indicate a file system path, a registry path, a file name or an imported module;
   capturing one or more additional components identified by the character strings parsed from the one or more binary executable files; and
   creating an application package comprised of the set of basic components and the additional components, wherein the application package is managed from a remote location and wherein the application package is executable on other endpoint computing devices different from the endpoint computing device.

2. The method of claim 1, wherein the application package is capable of being distributed to a second endpoint computing device and executed on the second endpoint computing device without performing an installation process of the application on the second endpoint computing device.

3. The method of claim 1, further comprising:
   filtering the additional components identified by the character strings parsed from the one or more binary executable files to exclude core operating system files, such that only non-core operating system files are included in the application package.

4. The method of claim 1, further comprising:
   scanning a component object model (COM) database on the endpoint device to identify any reference to files that were captured during inspection of the installation database or identified by the character strings in the one or more binary executable files;
   capturing any records of the COM database that contain the reference to said files.

5. The method of claim 1, further comprising:
   scanning shell extensions to identify any shell extensions that are based on the files that were captured during inspection of the installation database or identified by the character strings in the one or more binary executable files.

6. The method of claim 1, further comprising:
   scanning all shortcuts on a desktop and start menu on the endpoint device to identify any shortcuts that reference files that were captured during inspection of the installation database or identified by the character strings in the one or more binary executable files.

7. The method of claim 1, further comprising:
   capturing all file type associations of the application on the endpoint device and including the file type associations in the application package.

8. A computing device, comprising:
   at least one processor; and
   memory including instructions that, when executed by the at least one processor, cause the computing device to:
      inspect an installation database on an endpoint computing device to determine a set of basic components of an application installed on the endpoint computing device, the set of basic components including one or more binary executable files;
      parse the one or more binary executable files to identify character strings that indicate a file system path, a registry path, a file name or an imported module;
      capture one or more additional components identified by the character strings parsed from the one or more binary executable files; and
      create an application package comprised of the set of basic components and the additional components, wherein the application package is managed from a remote location and wherein the application package is executable on other endpoint computing devices different from the endpoint computing device.

9. The computing device of claim 8, wherein the application package is capable of being distributed to a second endpoint computing device and executed on the second endpoint computing device without performing an installation process of the application on the second endpoint computing device.

10. The computing device of claim 8, wherein the memory further includes instructions that when executed by the at least one processor, cause the computing device to:
    filter the additional components identified by the character strings parsed from the one or more binary executable files to exclude core operating system files, such that only non-core operating system files are included in the application package.

11. The computing device of claim 8, wherein the memory further includes instructions that when executed by the at least one processor, cause the computing device to:
    scan a component object model (COM) database on the endpoint device to identify any reference to files that were captured during inspection of the installation database or identified by the character strings in the one or more binary executable files; and
    capture any records of the COM database that contain the reference to said files.

12. The computing device of claim 8, wherein the memory further includes instructions that when executed by the at least one processor, cause the computing device to:
    scan shell extensions to identify any shell extensions that are based on the files that were captured during inspection of the installation database or identified by the character strings in the one or more binary executable files.

13. The computing device of claim 8, wherein the memory further includes instructions that when executed by the at least one processor, cause the computing device to:
    scan all shortcuts on a desktop and start menu on the endpoint device to identify any shortcuts that reference files that were captured during inspection of the installation database or identified by the character strings in the one or more binary executable files.

14. The computing device of claim 8, wherein the memory further includes instructions that when executed by the at least one processor, cause the computing device to:
  capture all file type associations of the application on the endpoint device and including the file type associations in the application package.

15. A non-transitory computer readable storage medium comprising one or more sequences of instructions, the instructions when executed by one or more processors causing the one or more processors to execute the operations of:
  inspecting an installation database on an endpoint computing device to determine a set of basic components of an application installed on the endpoint computing device, the set of basic components including one or more binary executable files;
  parsing the one or more binary executable files to identify character strings that indicate a file system path, a registry path, a file name or an imported module;
  capturing one or more additional components identified by the character strings parsed from the one or more binary executable files; and
  creating an application package comprised of the set of basic components and the additional components, wherein the application package is managed from a remote location and wherein the application package is executable on other endpoint computing devices different from the endpoint computing device.

16. The non-transitory computer readable storage medium of claim 15, wherein the application package is capable of being distributed to a second endpoint computing device and executed on the second endpoint computing device without performing an installation process of the application on the second endpoint computing device.

17. The non-transitory computer readable storage medium of claim 15, further comprising instructions executed by the one or more processors and causing the one or more processors to execute the operation of:
  filtering the additional components identified by the character strings parsed from the one or more binary executable files to exclude core operating system files, such that only non-core operating system files are included in the application package.

18. The non-transitory computer readable storage medium of claim 15, further comprising instructions executed by the one or more processors and causing the one or more processors to execute the operations of:
  scanning a component object model (COM) database on the endpoint device to identify any reference to files that were captured during inspection of the installation database or identified by the character strings in the one or more binary executable files;
  capturing any records of the COM database that contain the reference to said files.

19. The non-transitory computer readable storage medium of claim 15, further comprising instructions executed by the one or more processors and causing the one or more processors to execute the operation of:
  scanning shell extensions to identify any shell extensions that are based on the files that were captured during inspection of the installation database or identified by the character strings in the one or more binary executable files.

20. The non-transitory computer readable storage medium of claim 15, further comprising instructions executed by the one or more processors and causing the one or more processors to execute the operation of:
  scanning all shortcuts on a desktop and start menu on the endpoint device to identify any shortcuts that reference files that were captured during inspection of the installation database or identified by the character strings in the one or more binary executable files.

* * * * *